Jan. 8, 1952 L. G. COBLE 2,582,104
INTRAORAL TRACER AND BALANCER FOR DENTURES
Filed May 31, 1949
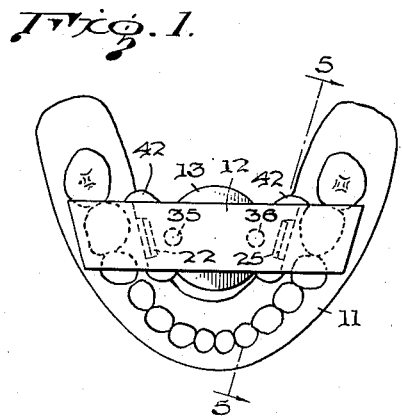
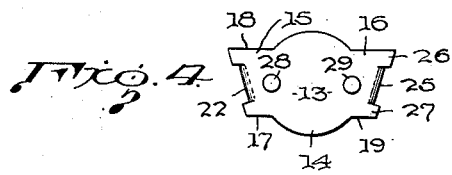
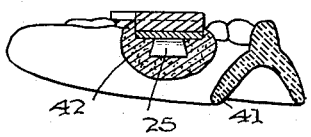
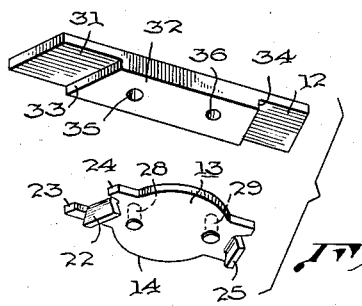
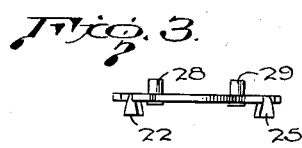
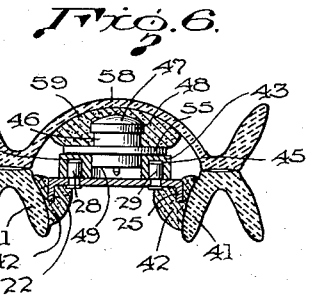
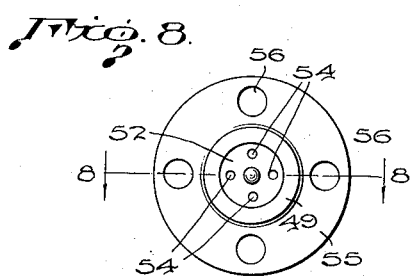
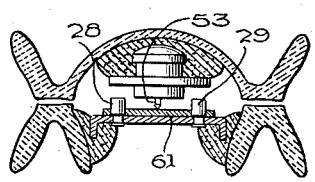
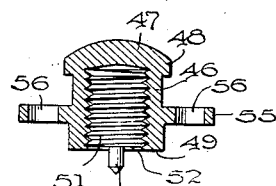
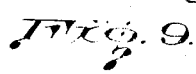
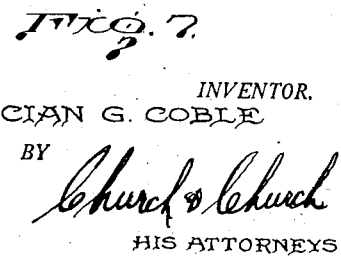
INVENTOR.
LUCIAN G. COBLE
BY Church & Church
HIS ATTORNEYS Patented Jan. 8, 1952

2,582,104

UNITED STATES PATENT OFFICE 2,582,104

INTRAORAL TRACER AND BALANCER FOR DENTURES

Lucian G. Coble, Greensboro, N. C.

Application May 31, 1949, Serial No. 96,345

4 Claims. (Cl. 32—19)

1

This invention relates to an intra-oral device which may be used to trace a gothic arch and to separate the dentures during balancing procedures.

A major object of this invention is to provide an intra-oral tracer and balancer which is comfortable for the patient while being utilized either to trace a gothic arch or to separate the dentures during balancing procedures.

Another object of this invention is to provide an intra-oral tracer and balancer in which the graph plate cannot be inadvertently dislodged by movement of the patient's tongue.

In accordance with these objects, one important feature of the invention resides in the thin plate forming the lower bridge which may be attached to the lingual flanges of the lower denture. This bridge has a circular central portion of the same size as the circular graph plate which rests upon the bridge, so the graph plate cannot be engaged by the tongue of the patient. Another important feature of the invention resides in the arrangement of ears on the bridge with depending flanges shaped to lie adjacent the lingual flanges of a lower denture where they may be secured by dental compound.

Other objects and advantages of the invention will become apparent from the following specification taken in connection with the accompanying drawing wherein:

Figure 1 is a plan view of a preferred form of bridge forming a part of the invention with a jig properly positioning the bridge in a lower denture;

Fig. 2 is an exploded perspective view of the bridge and jig shown in Fig. 1;

Fig. 3 is a front elevational view of the bridge shown in Figs. 1 and 2;

Fig. 4 is a plan view of the bridge shown in Fig. 3;

Fig. 5 is a sectional view taken on the line 5—5 of Fig. 1;

Fig. 6 is a cross-sectional view of upper and lower dentures showing the bridge secured by compound to the lingual flanges of a lower denture with a centering ring properly positioning a tracing pin and holder with respect to an upper denture;

Fig. 7 is a cross-sectional view similar to Fig. 6, but with the centering ring removed and a graph plate resting on the bridge;

Fig. 8 is a bottom view of the tracing pin and holder;

Fig. 9 is a sectional view taken on the line 9—9 of Fig. 7; and

2

Fig. 10 is a plan view of the graph plate.

In its preferred form, the invention includes a bridge of a thin plate having a circular central portion with ears extending from its opposite sides. The sides of the ears are straight, one being longer than the other so the ends of the ears converge forwardly at an angle corresponding to the included angle of the lingual flanges of a lower denture. The sides of each ear are parallel and alined with corresponding sides of the other ear. Each ear has a depending flange formed at its end between lobes at the sides of the ears. These flanges are wedge shaped with their wider ends at the lower extremities of the flanges. A pair of guide pins project upwardly from the face of the circular section. A circular graph plate of the same diameter as the circular section has apertures to accommodate the guide pins and center the graph plate on the bridge. To support the tracing pin, a cylindrical holder has a knob at its upper end for attachment by dental compound to the palate of an upper denture. A threaded stud is screwed into the holder and carries the tracing pin on its exposed end so the pin may be adjusted vertically with respect to the upper denture.

Referring now to the drawings, a lower denture 11 is illustrated in Fig. 1. Properly positioned in this denture 11 by a jig 12 is a bridge 13. Bridge 13 is formed of a thin flat plate having a circular central section 14. At diametrically opposed sides of central section 14, the bridge has outwardly projecting ears 15 and 16. Sides 17 and 18 of the ear 15 are parallel and rear side 18 is longer than forward side 17. Sides 19 and 21 of the ear 16 are also parallel and rear side 21 is longer than forward side 19. Thus, the ends of the ears 15 and 16 converge forwardly of the bridge. The center portion of ear 15 is bent downwardly to form depending flange 22 between the lobes 23 and 24 at the sides of the ear 15. The flange 22 is preferably wedge shaped with its larger area at its lower end. Similarly, ear 21 has its center portion bent downwardly to form flange 25 between lobes 26 and 27. Flange 25 is also wedge shaped with its wider area at its lower portion. On the upper face of circular section 14 a pair of guide pins 28 and 29 are arranged in spaced relation for a purpose to be described.

To properly position the bridge 13 with respect to the lower denture 11, jig 12 is formed of a strip 31 of a length corresponding to the width of the denture 11 at the zone where the bridge 13 is to be attached. On the under side of strip 31, the jig 12 is provided with a wedge shaped portion 32 having its sides 33 and 34 converging forwardly at the same angle of convergence as the ends of the bridge. This wedge shaped portion 32 has spaced holes 35 and 36 for receiving guide pins 28 and 29 of the bridge. The bridge is placed in position on the jig with its guide pins in the holes and its upper surface flush with the lower surface of wedge shaped portion 32 so the ends of the bridge are coincident with sides 33 and 34 on the jig. Then, the strip 31 of the jig is laid over the occlusal surfaces of the lower denture. The jig is then moved forwardly of the denture until its sides 33 and 34 and the ends of the bridge engage lingual flange 41 of the lower denture at corresponding points on opposite sides of the denture. The bridge is then properly positioned by the jig 12 as illustrated in Fig. 1. A small quantity of stick compound 42, in general use by dentists, may be applied at each end of the bridge to secure the bridge, by its wedge shaped flanges 22 and 25, to the lingual flange 41 at opposite sides of the denture.

With the bridge 13 properly positioned and secured in the lower denture, a tracing pin may be secured in the upper denture in the following manner. First, a centering ring 43 (Fig. 6) in the form of an annulus provided with holes 44 and 45, for receiving guide pins 28 and 29, is placed upon the bridge 13 with the guide pins in the holes. A cylindrical tracing pin holder 46 has its upper end 47 closed and formed with an enlarged knob 48 for a purpose to be described. Lower end 49 of cylindrical holder 46 is open and the interior of the holder is threaded to receive threads 51 on a stud 52 having at its lower end a balancing and tracing pin 53. Stud 52 may be turned in and out of the holder 46 by engagement of a suitable tool with holes 54, 54, in the lower end of the stud 52. Intermediate ends 47 and 49 of the cylindrical holder 46 is a circular flange 55 surrounding the holder and of somewhat greater diameter than the hole. The flange 55 is provided with a number of holes 56, 56, for a purpose to be described.

With stud 52 turned to its innermost position with pin 53 withdrawn, cylindrical holder 46 is inserted into the top of the centering ring 43, as illustrated in Fig. 6, so the flange 55 rests upon the upper surface of the ring. Then, a cone of softened compound is formed over the top of knob 48 and flange 55 and the upper denture is occluded with the lower denture in approximately centric position forcing the cone of compound against palate 58 of the upper denture 57. The compound may be seared to the palate of the upper denture and then cooled. This compound 59 retains the pin holder in position on the upper denture 57. To prevent rotation of the pin holder some of the compound 59 enters holes 56, 56, in flange 55.

The dentures are then separated and centering ring 43 is removed.

A circular graph plate 61, provided with apertures 62 and 63 spaced to receive guide pins 28 and 29 on the bridge 13 is placed upon the bridge 13 with the guide pins projecting through the apertures as illustrated in Fig. 7. Stud 52 is then turned so it moves outwardly with respect to holder 46 and pin 53 is extended below the holder to a desired point. The denture may then be inserted in the patient's mouth whereupon pin 53 bears upon graph plate 61.

To balance the denture, the tracing pin 53 is adjusted until it holds the teeth just out of occlusion in all mandibular movements. Carbon paper is placed between the teeth and the patient moves the teeth in lateral excursions only. By grinding the marked cusps, then turning the stud 52 in so the pin 53 is slightly withdrawn the procedure is repreated until proper balance of the denture is attained.

The same arrangement may be used for tracing a gothic arch. In this case, the bridge 13 is secured to a lower bite block whereas pin holder 46 is secured to the palate of an upper bite block. With graph plate 61 resting upon the bridge, the bite blocks are inserted in the patient's mouth with the pin 53 sufficiently extended to separate the jaws. Then, the patient manipulates his jaws in all directions so the pin traces a gothic arch on the graph plate. The traced arch is used in customary fashion for the proper construction of the dentures. The completed dentures may be balanced by following the balancing procedure already described.

Aside from the dentures, the only part of this intra-oral tracer and balancer which comes in contact with the patient's mouth is the bridge 13 across the lower denture. With the arrangement of the converging ends and depending flanges on the ears of the bridge, the bridge may be secured to the lingual flange of the lower denture by a small quantity of compound. This leaves only the smooth flat under surface of the bridge itself which may be engaged by the tongue of the patient.

By having the circular graph plate of the same diameter as the central circular section of the bridge, and retaining the plate superimposed upon the circular section of the bridge by the guide pins, the patient's tongue cannot dislodge the plate from the bridge during either tracing or balancing procedures.

What is claimed is:

1. In an intra-oral balancer and tracer of the character described, a bridge for attachment to a lower denture comprising a thin flat plate having a circular central section, integral ears extending outwardly at opposite sides of this section, each of said ears having parallel straight sides, one side being longer than the other so the ends of said ears are angularly disposed, converging forwardly of the bridge at an angle corresponding to the included angle of the lingual flanges of a lower denture, the center portions of the ends of said ears being bent downwardly to form depending flanges on each ear between lobes at the sides thereof, and spaced guide pins extending upwardly from the face of the circular central section.

2. In an intra-oral balancer and tracer of the character described, a bridge for attachment to a lower denture comprising a thin flat plate having a circular central section, integral ears extending outwardly at opposite sides of this section, each of said ears having parallel straight sides, one side being longer than the other so the ends of said ears are angularly disposed, converging forwardly of the bridge at an angle corresponding to the included angle of the lingual flanges of a lower denture, the center portions of the ends of said ears being bent downwardly to form depending flanges on each ear between lobes at the sides thereof, said flanges being wedge shaped with their wider areas at the lower extremities of the flanges, and spaced guide pins extending upwardly from the face of the circular central section.

3. An intra-oral balancer and tracer comprising a flat bridge having a circular central section, a pair of ears projecting outwardly from diametrically opposed points on the periphery of said circular section, each of said ears having a depending flange projecting downwardly from said bridge adapted to be secured by dental compound to lingual flanges of a lower denture so the bridge extends across the inside of the denture, a pair of spaced pins mounted on said circular section projecting solely from the upper surface thereof in a direction opposite to said flanges, a circular graph plate of the same diameter as said circular section, said graph plate being provided with spaced apertures to accommodate said pins and retain the graph plate superimposed upon the upper surface of said circular section, and a tracing pin provided with a holder for securing it to the palate of the upper denture so said pin will bear upon said graph plate when the dentures are properly positioned in a patient's mouth.

4. An intra-oral balancer and tracer comprising a flat bridge having a circular central section, a pair of ears projecting outwardly from diametrically opposed points on the periphery of said circular section, the sides of said ears being parallel with one side longer than the other and the sides of one ear alined with corresponding sides of the other ear so that the ends of said ears are angularly disposed converging forwardly of the bridge at an angle corresponding to the included angle of the lingual flanges of a lower denture, each of said ears having a depending flange projecting downwardly from said bridge adapted to be secured by dental compound to lingual flanges of a lower denture so the bridge extends across the inside of the denture, a pair of spaced pins on said circular section projecting in a direction opposite to said flanges, a circular graph plate of the same diameter as said circular section, said graph plate being provided with apertures to accommodate said pins and retain the graph plate superimposed upon said circular section, and a tracing pin provided with a holder for securing it to the palate of the upper denture so said pin will bear upon said graph plate when the dentures are properly positioned in a patient's mouth.

LUCIAN G. COBLE.

REFERENCES CITED

The following references are of record in the file of this patent:

UNITED STATES PATENTS

| Number | Name | Date |
|---|---|---|
| 1,764,115 | Mulcahy | June 17, 1930 |
| 2,183,512 | Brenner | Dec. 12, 1939 |
| 2,255,267 | Moran | Sept. 9, 1941 |
| 2,447,287 | Smith et al. | Aug. 17, 1948 |